United States Patent
Kang et al.

(10) Patent No.: US 10,206,490 B2
(45) Date of Patent: Feb. 19, 2019

(54) ACCESSORY DEVICE FOR ELECTRONIC DEVICE AND METHOD FOR MANUFACTURING THE SAME

(71) Applicant: Samsung Electronics Co., Ltd., Gyeonggi-do (KR)

(72) Inventors: Seung Mo Kang, Gyeonggi-do (KR); Tae Seuk Kang, Gyeonggi-do (KR); Cheol Hee Kim, Seoul (KR); Joon Young Jo, Seoul (KR); Jong Sun Baek, Seoul (KR); Heon Yeap Baek, Gyeonggi-do (KR); Min Woo Yoo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 388 days.

(21) Appl. No.: 15/206,392

(22) Filed: Jul. 11, 2016

(65) Prior Publication Data
US 2017/0049000 A1 Feb. 16, 2017

(30) Foreign Application Priority Data
Aug. 11, 2015 (KR) .................. 10-2015-0113056

(51) Int. Cl.
| | | |
|---|---|---|
| *B65D 85/00* | (2006.01) | |
| *A45F 5/00* | (2006.01) | |
| *A45C 11/00* | (2006.01) | |
| *A45C 13/00* | (2006.01) | |
| *H04M 1/18* | (2006.01) | |

(52) U.S. Cl.
CPC ............ *A45F 5/00* (2013.01); *A45C 11/00* (2013.01); *A45C 13/002* (2013.01); *A45C 2011/001* (2013.01); *A45C 2011/002* (2013.01); *A45C 2011/003* (2013.01); *H04M 1/185* (2013.01)

(58) Field of Classification Search
USPC ........ 206/320, 524.3, 701; 53/473, 467, 461
See application file for complete search history.

(56) References Cited

U.S. PATENT DOCUMENTS

| | | | | |
|---|---|---|---|---|
| 7,044,295 | B2 * | 5/2006 | Sugiyama | G11B 33/0427 206/232 |
| 8,505,718 | B2 * | 8/2013 | Griffin, Jr. | A45C 11/00 206/320 |
| 2006/0163090 | A1 * | 7/2006 | Sugiyama | G11B 33/0427 206/308.1 |
| 2010/0012362 | A1 | 1/2010 | Abe et al. | |

(Continued)

*Primary Examiner* — Jacob K Ackun
(74) *Attorney, Agent, or Firm* — Cha & Reiter, LLC

(57) ABSTRACT

An accessory device comprising: a first cover arranged to be opened and closed when the first cover is mounted on an electronic device, the first cover comprising a first plate, at least one first side wall protruding from the first plate in a first direction, and a first film disposed in a space defined by the sidewall and the plate, wherein the first film and the first side wall are at least partially transparent, and wherein the first film comprises a first layer disposed on the first plate, the first layer being at least partially reflective, a second layer disposed on the first layer, the second layer being at least partially formed of a polymeric material, and a third layer that is disposed on the second layer, the third layer being an anti-wear layer.

20 Claims, 22 Drawing Sheets

(56) References Cited

U.S. PATENT DOCUMENTS

2013/0042581 A1* 2/2013 Holben ................ H04B 1/3888
  53/473
2013/0092576 A1* 4/2013 Rayner ................ G06F 1/1626
  206/320

* cited by examiner

_US 10,206,490 B2_

ACCESSORY DEVICE FOR ELECTRONIC DEVICE AND METHOD FOR MANUFACTURING THE SAME

CLAIM OF PRIORITY

This application claims the benefit under 35 U.S.C. § 119(a) of a Korean patent application filed on Aug. 11, 2015 in the Korean Intellectual Property Office and assigned Serial number 10-2015-0113056, the entire disclosure of which is hereby incorporated by reference.

TECHNICAL FIELD

The present disclosure relates to a protection accessory device that protects an external appearance of a portable electronic device.

BACKGROUND

A portable electronic device has a display on one surface thereof, and may output a screen according to an operation of the device. Further, the portable electronic device is made thin and light for portability. The electronic device may be easily damaged according to an external impact or a fall impact. An accessory protection cover may be provided for preventing damage.

The accessory protection cover that surrounds an electronic device according to the related art may be damaged due to various daily life scratches according to the usage of the user. When scratches are generated, potential problems in the performance of the accessory protection cover may be generated, deteriorating an aesthetic feeling and causing an unpleasant feeling to the user.

SUMMARY

Aspects of the present disclosure are to address at least the above-mentioned problems and/or disadvantages and to provide an accessory device that endures scratches and is detachably mounted on an electronic device.

According to aspects of the disclosure, an accessory device is provided comprising: a first cover arranged to be opened and closed when the first cover is mounted on an electronic device, the first cover comprising a first plate, at least one first side wall protruding from the first plate in a first direction, and a first film disposed in a space defined by the sidewall and the plate, wherein the first film and the first side wall are at least partially transparent, and wherein the first film comprises a first layer disposed on the first plate, the first layer being at least partially reflective, a second layer disposed on the first layer, the second layer being at least partially formed of a polymeric material, and a third layer that is disposed on the second layer, the third layer being an anti-wear layer.

According to aspects of the disclosure, a method is provided for manufacturing an accessory device that is mountable on an electronic device, the method comprising: forming a first plastic substrate comprising a base and at least one side wall protruding from at least a portion of the base in a first direction; forming a multilayered film on the first plastic substrate, the multilayered film comprising a transparent or translucent first layer that is formed on the base of the first plastic substrate to reflect at least a portion of incoming light, a second layer disposed on the first layer that is formed at least in part of a polymeric material, and a third layer having a predetermined hardness; and applying pressure on the multilayered film.

According to aspects of the disclosure, an accessory device is provided that is mountable on an electronic device having a display, the accessory device comprising: a translucent plate configured to cover at least a portion of the display of the electronic device when the accessory device is mounted on the electronic device, and comprising a curved peripheral portion and a flat portion that is adjacent to the curved peripheral portion; at least one film formed on the plate that faces a side opposite to the display, when the accessory device is mounted on the electronic device; and a member connected to a portion of the plate that is arranged to be detachably mounted on the electronic device, wherein the at least one film transmits at least a portion of incident light from the display while reflecting at least a portion of ambient light that is incident on the film.

Other aspects, advantages, and features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
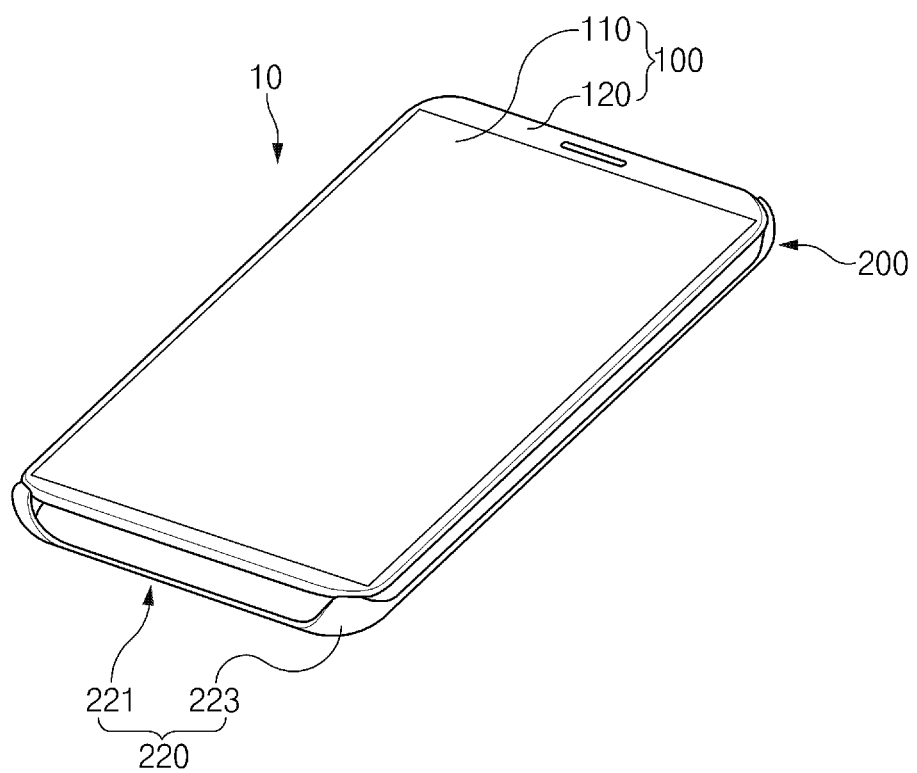
FIG. 1A is a diagram of an example an accessory device when the accessory device is in a closed state, according to an embodiment.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to the description of the drawings, similar components may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments, the wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), or implantable types (e.g., implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic panel.

In another embodiment of the present disclosure, the electronic device may include at least one of various medical devices (e.g., various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (e.g., a navigation device for vessels and a gyro compass), avionics, a security device, a vehicular head unit, an industrial or home robot, an automatic teller's machine (ATM) of a financial company, a point of sales (POS) of a store, or an internet of things (e.g., a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of furniture or a part of a building/structure, an electronic member, an electronic signature receiving device, a projector, or various measurement devices (e.g., a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (e.g., an artificial intelligence electronic device) that uses an electronic device.

FIG. 1A is a diagram of an example an accessory device when the accessory device is in a closed state, according to an embodiment.

Referring to FIG. 1A, the accessory device 10 may include an upper cover 100 (or a first cover) and a lower cover 200 (or a second cover). The aforementioned accessory device 10 may be processed such that at least one outer surface (for example, a surface opposite to a surface that faces the mounted electronic device) of the upper cover 100 or the lower cover 200 has a specific hardness or higher. For example, a laminated film of a specific hardness or higher may be disposed on at least one outer surface of the upper cover 100 or the lower cover 200. According to aspects of the disclosure, the laminated film may provide a certain degree of scratch resistance.

The upper cover 100 may be arranged to cover a first surface (for example, an upper surface on which a display is disposed) in a first direction. The upper cover 100, for example, may have a size that is similar to an upper surface of the electronic device or may have a size that is larger than the size of the upper surface of the electronic device by a specific size. According to various embodiments, the upper cover 100 may be smaller than the upper surface of the electronic device by a specific size. The surface (a surface that is opposite to the display when the upper cover 100 is arranged to cover the display) of the upper cover 100 in the first direction may be arranged to have a specific hardness (a hardness that may resist scratches). Alternatively, a film layer having a specific hardness may be disposed on the upper surface of the upper cover 100. Alternatively, the upper surface of the upper cover 100 may be hard-coated with a material having a specific hardness. Alternatively, the upper surface of the upper cover 100 may be polished to have a specific hardness.

According to various embodiments, the upper cover 100 may include a first film layer 110 and a first member 120 (or a first board). At least a portion of the first film layer 110 may be processed to have a specific hardness or higher, or a layer having a specific hardness or higher may be disposed on the first film layer 110. The first film layer 110, for example, may have a specific transparency. Further, the first film layer 110, for example, may reflect a least a portion of incident light. A first film layer 110 is disposed on one surface (for example, an upper surface in the first direction) of the first member 120, and an opposite surface (for example, a lower surface in the second direction) of the first member 120 may face the lower cover 200 or the display of the mounted electronic device. The first member 120, for example, may be a plastic substrate having a specific transparency. According to an embodiment, the first member 120 may be translucent or transparent. The first member 120, for example, may include a first plate on which the first film layer 110 is seated, and at least one first side wall extending from a periphery of the first plate at a specific angle.

The lower cover 200, for example, may protect a rear surface and side surfaces of the seated electronic device. The lower cover 200 may include a second member 220 (or a second board). The second member 220, for example, may include a second plate 221 and at least one protective wall 223 extending from one side (for example, a periphery) of the lower cover in the first direction. The second plate 221, for example, may be a plastic substrate. Further, the second plate 221, for example, may be formed of the same material as that of the first member 120. According to various embodiments, the second plate 221 may have a specific transparency (a transparent or translucent state). The protective wall 223, for example, may extend from a periphery of the second plate 221 by a specific height in one direction (for example a direction perpendicular to the front surface of the second plate 221 or the first direction). According to an embodiment, the protective wall 223 may extend from a corner area of the second plate 221 and may become curved in a specific direction as it goes from the bottom to the upper side. Further, the protective wall 223 may have a larger width at a lower portion thereof (e.g., near the plate 231) than at an upper portion thereof. The protective wall 223 may have elasticity, and if the electronic device is mounted, the lower cover 200 may be fixed to the electronic device due to the elastic force. Although it is illustrated in FIG. 1A that the protective walls 223 are arranged at corner areas of the second plate 221, at least one protective wall 223 also may be disposed between the corners according to various embodiments.

As described above, at least one of the upper cover 100 or the lower cover 200 of the accessory device 10 according to an embodiment may include a transparent or translucent plastic substrate, a translucent and reflective film layer, bonding members for attaching the transparent or translucent plastic substrate and the film.

Although in the present example the upper cover 100 and the lower cover 200 are formed of the same material, various embodiments are not limited thereto. According to various embodiments, the upper cover 100 (or the lower cover 200) may be formed of a plastic substrate and the lower cover 200 (or the upper cover 100) may be formed of synthetic rubber, a polymeric material, or a silicon material. According to various embodiments, at least one of the upper cover 100 or the lower cover 200 may be formed of a glass material or a material (for example, sapphire or ruby) of a specific hardness or higher.

Figure 1B:
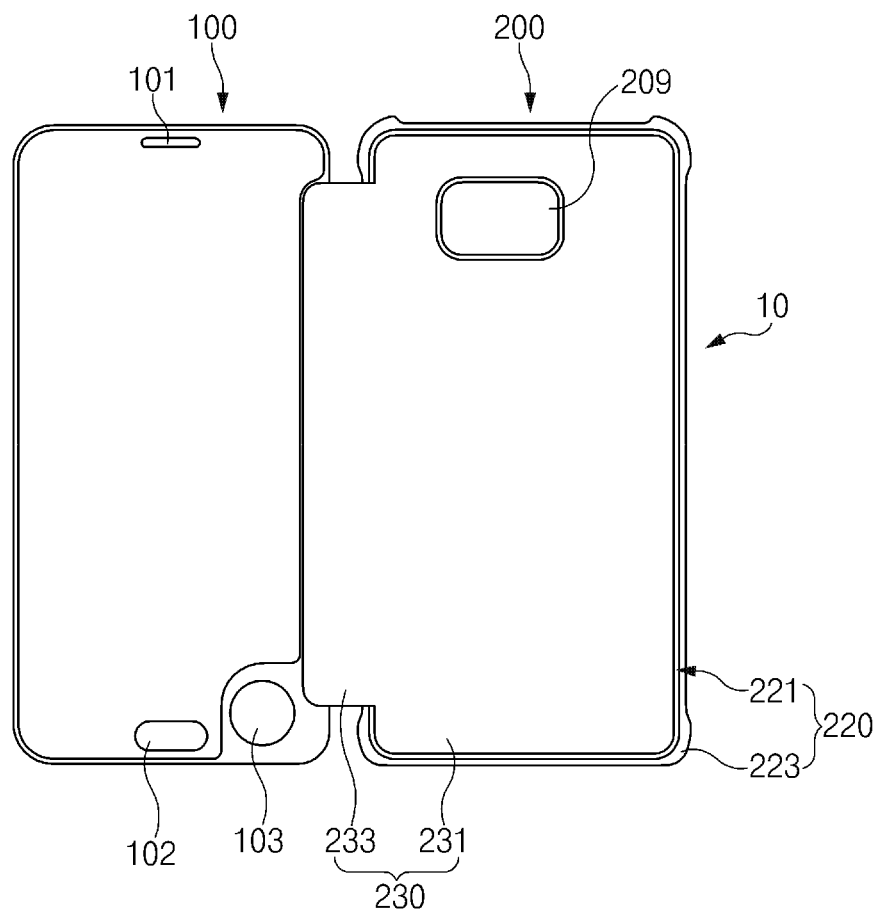
FIG. 1B is a diagram of an example an accessory device when the accessory device is in an opened state, according to an embodiment.

FIG. 1B is diagram of an example an accessory device when the accessory device is in an opened state, according to an embodiment.

Referring to FIG. 1B, the inside of the first member of the upper cover 100, for example, may include a speaker opening 101 (e.g., a receiver hole), a button opening 102 (e.g., a button recess), and a Hall sensor magnet 103. The button opening 102 may correspond to a home button provided in the mounted electronic device 20. The upper cover 100 may be connected to the lower cover 200 through a connector 233. The upper cover 100 may be hinged about the connector 233. The area in which the connector 233 is seated may be formed (for example, stepped) to be lower than a surrounding area. Accordingly, the inner surface of the upper cover 100 may be arranged to have a uniform height after the connector 233 is seated.

The lower cover 200, for example, may include a shielding layer 230 and a second member 220. The shielding layer 230, for example, may include a connector 233 and a plate 231. A camera hole 209 through which a camera is exposed may be provided on one side (for example, an upper end) of the lower cover 200. The connector 233 may have a width smaller than the entire width of a periphery of one surface at one side of the periphery of the plate 231, and may extend laterally by a specific length. According to various embodiments, the connector 233 may be formed of leather, synthetic leather, cotton flannel, or a polymeric material. According to various embodiments, the connector 233 may be formed of the same material as that of the first member 120 or the second member 220. The connector 233, for example, may include at least one longitudinal fold. The at least one longitudinal fold may allow the upper cover 100 to be hinged more softly. As described above, one side of the connector 233 may be connected to the plate 231, an opposite end of the connector 233 may be connected to one side of the upper cover 100, and a specific width of a central portion of the connector 233 may be exposed to the outside. The width of the central portion, for example, may correspond to the thickness of the electronic device or may be rather larger than the thickness of the electronic device.

The plate 231 is seated inside the second member 220, and the connector 233 may be connected to one side of the plate 231. The plate 231 and the connector 233 may be formed of the substantially same material. The plate 231, for example, may be formed of an opaque material. Further, the plate 231 may be formed of a transparent or translucent material. The entire size of the plate 231 may be smaller than that of the member 220 in order for it to be seated inside the plate 231. A hole, through which a camera may be exposed, may be formed on one surface of the plate 231.

As described with reference to FIG. 1A, the second member 220 may include a second plate 221 and at least one protective wall 223. In the example of FIG. 231, the protective wall 223 has a specific width at four corners of the second plate 221. The second plate 221, for example, may have a curved shape (or a curved shape having a specific curvature) protruding further at a peripheral portion than at a central portion thereof such that the plate 231 may be seated. An area of the second plate 221 in which the connector 233 is disposed does not have a curved portion and may be flat. Further, the second plate 221 also may have a curved portion in an area in which the connector 233 is arranged to firmly support a periphery of the seated electronic device.

Figure 2:
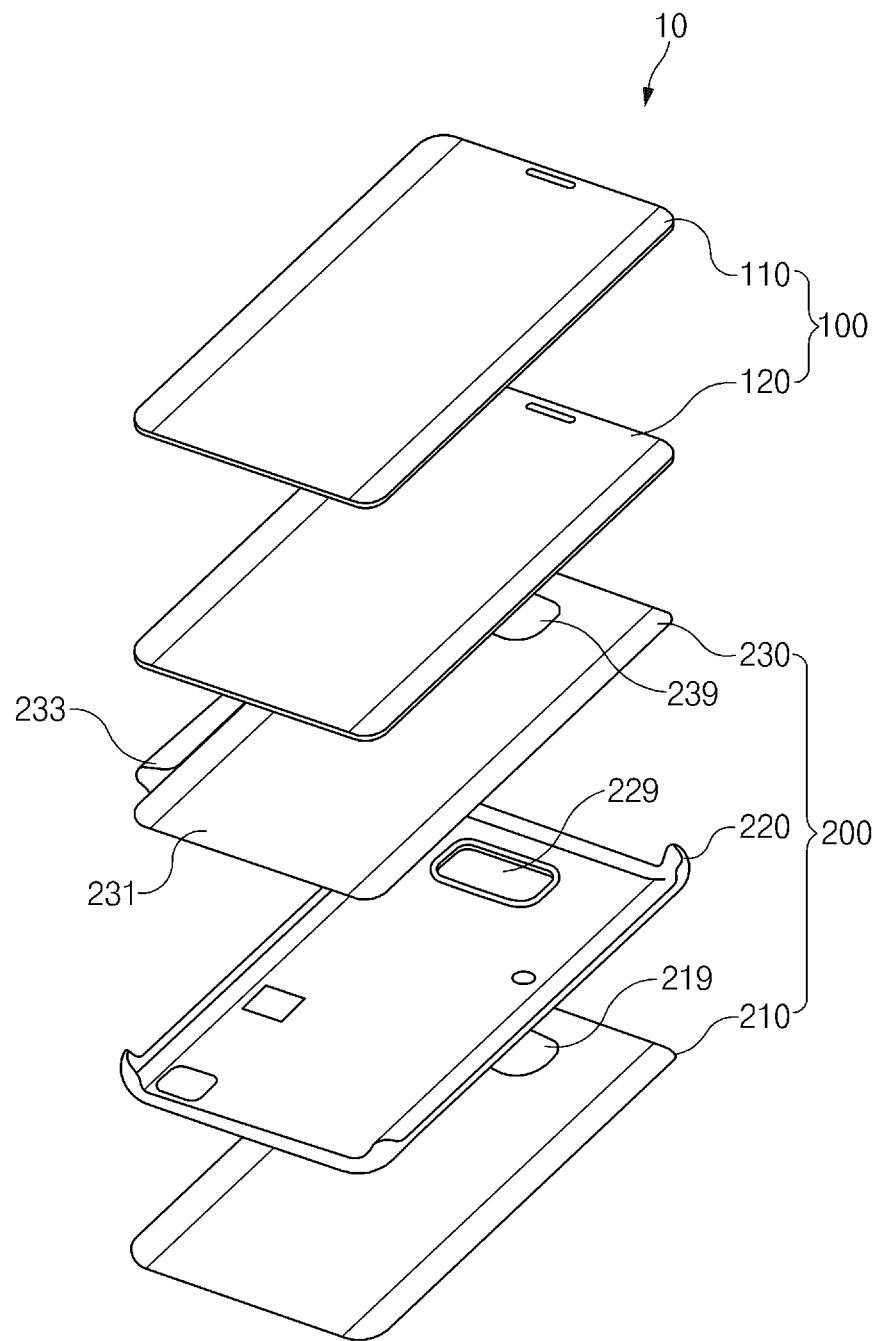
FIG. 2 is an exploded perspective view of an accessory device, according to an embodiment.

FIG. 2 is an exploded perspective view of an accessory device, according to an embodiment.

Referring to FIG. 2, the accessory device 10 may include an upper cover 100 and a lower cover 200. Central portions of the upper cover 100 and the lower cover 200 may be flat and opposite sides thereof may correspond to an electronic device having a specific curvature. For example, opposite sides of at least one of the upper cover 100 or the lower cover 200 may be curved to have the same or different curvatures. According to various embodiments, in correspondence to the shape of an electronic device, which is to be mounted, the accessory device 10 may have curved surfaces only at two opposite sides of the upper cover 100 or have curved surfaces only at two opposite sides of the lower cover 200. Alternatively, in the accessory device 10, a curved surface may be formed only at one side of the upper cover 100 or the lower cover 200. Accordingly, although it is illustrated in the drawing that two opposite sides of the accessory device 10 have a curved surface, according to the present invention, in the accessory device 10, at least one of opposite sides of the upper cover 100 or the lower cover 200 may have a curved surface of a specific width.

The upper cover 100 may include a first film layer 110 and a first member 120 (or an upper cover). The first film layer 110 may have a specific transparency (for example, a transparent or translucent form) as a whole. At least a portion of the first film layer 110 may reflect incident light. At least a portion of the first film layer 110 may be coupled to the first member 120. Although it is illustrated in the drawing that opposite sides of the first film layer 110 are curved unlike a central portion thereof, various embodiments are not limited thereto. For example, the first film layer 110 may have a specific tensile force. Accordingly, the first film layer 110 may be arranged such that the central portion and the sides thereof are flat.

The first member 120 may have a specific strength, and may include a seating part in which the first film layer 110 is seated. The first member 120, for example, may have a specific transparency (for example, a transparent or translucent form). At least one of the opposite sides of the first member 120 may be curved in a direction (for example, the second direction of the lower cover 200) with respect to the central portion thereof. According to various embodiments, a side of the first member 110 may be curved while the flat first film layer 110 having a tensile force is seated on and fixed to the first member 120, at least one side of which is curved. According to various embodiments, the first film layer 110 may be seated and fixed to correspond to the shape of the first member 120.

The lower cover 200 may include a shielding layer 230, a second member 220, and a second film layer 210. At least a portion (for example, the plate 231) of the shielding layer 230 may be seated on and fixed to the second member 220, and the connector 233 may protrude to one side of the second member 220 and then be curved. The second film layer 210 may be disposed under the second member 220.

The shielding layer 230 may include a plate 231 formed of an opaque material or a material having a specific transparency and a connector 233. The connector 233 may be connected to one side of the plate 231 to be curved, and the curved end of the connector 233 may be fixed or otherwise coupled to one side of the first member 120 of the upper cover 100. A hole 239 corresponding to the camera hole 209 may be disposed on one side of the plate 231.

The second member 220 may have a specific thickness and a surface, and may include a seating part on which the plate 231 may be seated and a rear surface on which the second film layer 210 is disposed. The second member 220 may include a hole 229 corresponding to the camera of the electronic device 100. According to various embodiments, an NFC module, a magnetic force shielding part (e.g., a part that blocks the magnetic force of a Hall sensor magnet), and the like may be disposed on the second member 220. The NFC module, the magnetic force shielding part, and the like may be shielded by the shielding layer 230 while the shielding layer 230 is seated. As illustrated, the second member 220 may include a second plate, and at least one protective wall disposed at a corner area of the second plate.

For example, a central portion of the second member 220 and a portion of the second plate may be formed to be flat, and a peripheral area of the second plate may be curved. A peripheral portion of the second member 220 may be arranged to correspond to the shape of a rear surface of the electronic device formed to be smoothly curved in the first direction.

The second film layer 210, for example, may be formed of the same material as that of the first film layer 110 and have the same shape as the first film layer 110. The second film layer 210 may be formed of a transparent or translucent material. At least a portion of the second film layer 210 may reflect external light. The second film layer 210 may be formed in the same manner as the first film layer 110 to have the same color and function (an anti-scratch function) as those of the first film layer 110. The second film layer 210 may include a hole 219 corresponding to the hole 209.

Figure 3:
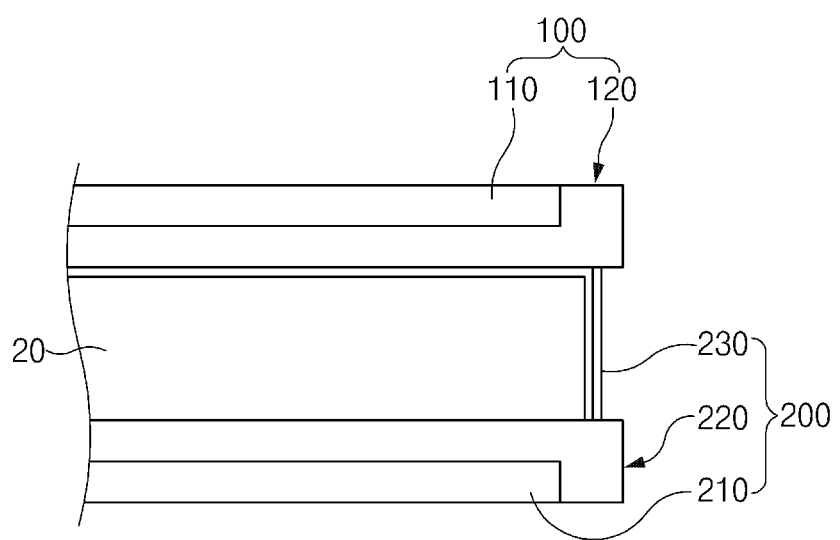
FIG. 3 is a partial cross-sectional view of an accessory device, according to an embodiment.

FIG. 3 is a partial cross-sectional view of an accessory device, according to an embodiment.

Referring to FIG. 3, the accessory device 10 of the electronic device 20 may include an upper cover 100 and a lower cover 200. The electronic device 20 may be disposed between the upper cover 100 and the lower cover 200.

The upper cover 100 may include a first member 120 and a first film layer 110. The first member 120 may include at least one side wall arranged at a peripheral portion thereof in the first direction (for example, an upper surface), and the first side wall may surround or support a periphery of the first film layer 110. Because the first side wall of the first member 120 has a band shape, the first member 120 may include a first seating part in which the first film layer 110 may be seated. When the first film layer 110 is seated in the first seating part, the first film layer 110 may be prevented from coming out or being separated from the first member 120. A rear surface of the first member 120 corresponding to the second direction may face one side (for example, a display) of the electronic device 20. A side of the first member 120 may be fixed or otherwise coupled to one end of the connector 233. At least a portion of the first film layer 110 may have a specific hardness (for example, an anti-scratch hardness). Accordingly, the first film layer 100 may prevent the occurrence of scratches on the display (or another portion) of the electronic device 20.

The lower cover 200 may include a second member 220, a second film layer 210, and a connector 233. A second side wall disposed at a peripheral portion of the second member 220 may form a second seating part in the second direction (for example, a lower or rear surface). If the second film layer 210 is seated in the second seating part, the second side wall may support or surround a peripheral side surface of the second film layer 210. At least a portion of the second film layer 210 may have a specific hardness (for example, an anti-scratch hardness). The second film layer 210 disposed in the second direction may prevent the occurrence of scratches on the electronic device 20. The connector 233 of the lower cover 200 extending from the plate disposed inside the second member 220 may be fixed or otherwise coupled to the upper cover 100. The connector 233 may be arranged to cover a side of the electronic device 20, and may protect the side of the electronic device 20.

The electronic device 20, for example, may have a specific thickness and may be seated on and fixed to the lower cover 200. According to an embodiment, the rear surface of the electronic device 20 may face the plate of the lower cover 200. A display area of the electronic device 20 may be arranged to face a rear surface of the upper cover 100. The display area of the electronic device 20 may be exposed by rotating the upper cover 100 relative to the lower cover 200.

According to the embodiment, a transparent or translucent film of a PET material may be attached to an opposite surface of a UV molded part, to which deposition and printing are applied, of at least a portion of the upper cover 100 or the lower cover 200. A film layer (for example, the first film layer or the second film layer) having a reinforced anti-scratch property, in which hard coating of a specific hardness is applied to a transparent or translucent film may be disposed in a grooved transparent or translucent plastic substrate (for example, the first member 120 or the second member 220).

According to various embodiments, the aforementioned film layer may include layers as in Table 1 or 2.

TABLE 1

| Structural view | Thickness for processes | Note |
| --- | --- | --- |
| Top protective film | 50 μm | For preventing process foreign substances, removable |
| Anti-wear H/C layer | 4 μm | |
| PET layer | 75 μm | |
| Primer | 3 μm | |
| Logo printing layer | 3 μm | Applied to a lower cover |
| UV pattern printing layer | 9 μm | |
| Multi-deposition layer | | |
| Rear surface printing layer | Top 8-9 μm/ Cradle 11-12 μm | |
| OCA layer | 40 μm | |
| Releasing film | 100 μm | Removed before a film layer is attached to a member |

TABLE 2

| Structural view | Thickness for processes | Note |
| --- | --- | --- |
| Top protective film layer | 50 μm | For preventing process foreign substances, removable |
| Anti-wear H/C layer | 4 μm | |
| PET layer | 75 μm | |
| Primer | 3 μm | |
| One degree logo printing layer | 3 μm | Applied to a lower cover |
| UV pattern printing layer | 9 μm | |
| Multi-deposition layer | | |
| OCA layer | 40 μm | |
| Releasing film | 100 μm | Removed before a film layer is attached to a member |

Referring to FIG. 1, the first film layer 110 or the second film layer 210 may include a top protective film, an anti-wear hard coating (H/C) layer, a PET (or polymer) layer, a primer printing layer (a one degree logo), a UV pattern printing layer, a multi-deposition layer, a rear surface printing layer, an optical clear adhesive (OCA) layer, and a releasing film. The film layer described in Table 1 and the film layer described in Table 2 may be classified based on whether a rear surface printing layer is applied between the multi-deposition layer and the OCA layer. The rear surface printing layer relates to shielding, such as transmission of light, and it may be determined whether the rear surface printing layer according to the color and whether shielding will be made.

The top protective film may be temporarily arranged to protect the protective film. The top protective film may be removed after the film layer is attached to the cover. According to an embodiment, the top protective film may be removed selectively before or after the film layer is pressed. The top protective film may be disposed on the anti-wear H/C layer after the anti-wear layer is formed in the PET layer. According to an embodiment, the anti-wear layer is harder than the pet layer.

The anti-wear H/C layer may be formed of a material having a specific hardness or higher to have a resistance to scratches. According to various embodiments, the anti-wear H/C layer may be arranged on the PET layer (for example, between the top protective film and the PET layer) or on and under the PET layer.

The PET layer may function as a central layer of the film layer. The PET layer may be arranged to have a specific transparency (for example, transparent or translucent). After the PET is formed, a film layer (for example, the anti-wear H/C layer) may be disposed on (or on and under) the PET layer.

The primer may be disposed under the PET layer to perform a bonding function.

The printing layer may include a layer formed with a one degree logo on the PET layer. The printing layer, for example, may include a layer that is applied only to the lower cover. Accordingly, the upper cover may lack a printing layer in some implementation.

The UV pattern printing layer is a layer in which a UV molding part in the form of a matrix is formed. In relation to the arrangement of the UV pattern printing layer, a UV pattern (for example, the UV pattern printing layer) in the form of a matrix may be arranged based on a UV molding part applying process and a photosensitizing process.

The multi-deposition layer may include a plurality of layers formed on or over the UV pattern printing layer. The multi-deposition layer is formed by a multilayer of a specific material is applied to have a specific thickness in relation to the color of the accessory device 10, and in the process, the multi-deposition layer may have a specific color due to the thickness of the layer or the color or the thickness of the material. According to an embodiment, the multi-deposition layer may include a multilayer including titanium, silicon, and indium.

The rear surface printing layer is a layer on which the color of the accessory device 10 is printed. According to an embodiment, the color of the accessory device 10 may be determined as the color of the rear surface printing layer is applied. The upper cover (for example, a top), for example, may exhibit a specific color (for example, blue black or silver) through two degree (two layer) printing. The lower cover (for example, a cradle) may exhibit a specific color three degree (three layer) printing. The two degree printing process of the lower cover may be performed in the same manner as the printing of the upper cover. The lower cover may be opaquely processed through application of an additional color material in the three degree printing process.

The OCA layer may be a bonding layer disposed under the rear surface printing layer. The OCA layer functions to bond the film layer onto the member of the cover. A releasing film may be disposed under the OCA layer. The OCA layer may be disposed for the purpose of moving the film layer, and may be removed before the film layer is bonded onto the member.

The aforementioned method for manufacturing a film layer includes a process of attaching a PET layer, to which hard coating (H/C) is applied, to a UV molding part, to which pattern printing and multi-deposition are applied. The hard coating layer applied to the UV molding may be a coating layer having an anti-wear and anti-scratch property, and may be coated to have a thickness of about 4 μm. In order to improve an attachment force between the UV molding part and the PET layer, a primer layer may be applied between the UV molding part and the PET layer material. The primer layer is a layer for reinforcing attachment force, and may be omitted. The OCA layer is attached to a lower side of the PET layer (or the primer layer) for attachment to the member. In the embodiment, an OCA layer having a thickness of about 40 μm may be applied for smooth bonding and attachment to plastic, and the thickness of the OCA layer may be changed according to an applied environment. The transmission rate of the film layer may be different for different colors. According to an embodiment, gold may show a transmission rate of 10 to 14%, silver may show a transmission rate of 13 to 17%, and black may show a transmission rate of 3 to 6%. The member may be manufactured through injection-molding. A resin of a specific material may be used for ensure the strength and the anti-impact property of a part that surrounds the electronic device at the lower cover.

Figure 4:
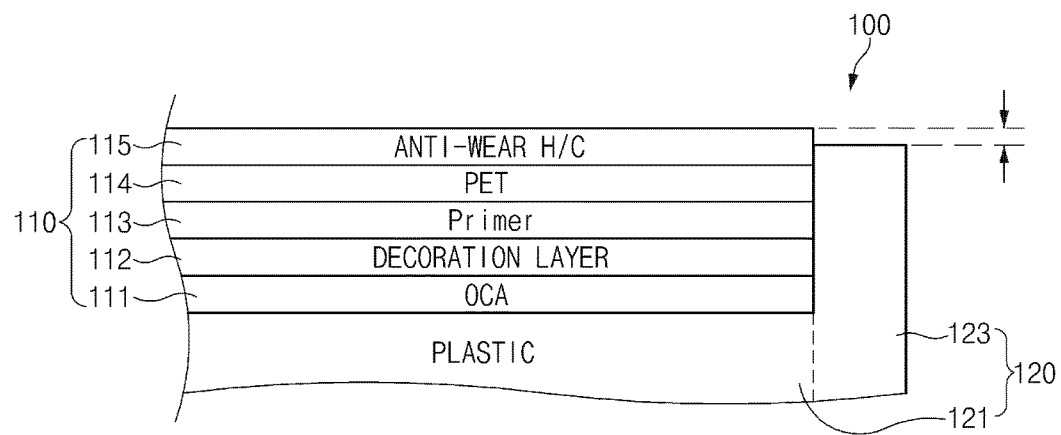
FIG. 4 is a partial cross-sectional view of an accessory device, according to an embodiment.

FIG. 4 is a partial cross-sectional view of an accessory device, according to an embodiment. As illustrated, the upper cover 100 may include a first member 120 and a first film layer 110. The first member 120 may be formed of a transparent or translucent material. For example, the first member 120 may be formed of a plastic substrate or of a transparent or translucent polymeric material. The first member 120 may include a first plate 121 and a first side wall 123. The first plate 121, for example, may have an area corresponding to the size of a front surface or a rear surface of the electronic device. The first side wall 123 may extend from a periphery of the first plate 121 at a specific angle (for example, the right angle from the first plate 121) from the first plate 121 by a specific height. According to an embodiment, the first side wall 123 may have a seating area at the entire periphery of the first plate 121 in a band shape. The height of the first side wall 123, for example, may be smaller than the sum of the height of the first plate 121 and the height of the first film layer 1120 positioned on the first plate 121. Accordingly, an upper portion of the first film layer 110 may protrude further than the first side wall 123. Although in the present example the cover 100 is depicted in FIG. 1, in some implementations the cover 200 may have the same structure as the cover 100.

The first film layer 110 may be transparent or translucent, or reflective according to an embodiment, and may be disposed on the first plate 121 of the first member 120. The periphery of the first film layer 110 may be arranged to face the first side wall 123 when the first film layer 110 is positioned on the plate 121. Then, the first film layer 110 may be arranged to be higher than an upper end of the first side wall 123. The first film layer 110, for example, may include a coating layer 115, a polymeric layer 114, a first bonding layer 113 (primer), a decoration layer 112, and a second bonding layer 111. The coating layer 115, for example, may have a specific hardness or higher and may be designed to be scratch-resistant. The polymeric layer 114, for example, may be formed of a PET material. The coating layer 115 may be disposed on the polymeric layer 114, and the first bonding layer 113 may be disposed under the polymeric layer 114. The first bonding layer 113 may be omitted according to a change in design. The first bonding layer 113 may be provided in relation to bonding of the polymeric layer 114 and the decoration layer 112. The decoration layer 112, for example, may include the printing layer, the UV pattern printing layer, and the multi-deposition layer, which have been described with reference to FIG. 3. The decoration layer 112, for example, may include the printing layer, the UV pattern printing layer, the multi-deposition layer, and the rear surface printing layer, which have been described with reference to FIG. 3. The first bonding layer 113 may be disposed under the decoration layer 112 and functions to fix the above-listed configurations to the first plate 121 of the first member 120. According to the aforementioned lamination form, a portion of the coating layer 115 of the first film layer 110 may be arranged to be lower than the first side wall 123, and the remaining portions of the first film layer 110 may be arranged to be higher than the first side wall 123.

According to an aspect of the present disclosure, there is provided an accessory device detachably mounted on a mobile electronic device, the electronic device including a housing having a first surface (for example, an upper surface) facing a first direction and a second surface (for example, a lower surface) facing a second direction opposite to the first direction, the accessory device including a cover disposed on the first surface of the housing of the electronic device to be opened and closed, wherein the first cover includes a first member including a first plate (or a first plastic substrate) covering the first surface of the housing and at least one first side wall having a transparency and protruding from a portion of the first plate in the first direction, and a first film layer (or a multilayered film) having a transparency and disposed in the interior of an area defined by the at least one first side wall, and wherein the first film layer includes a transparent or translucent first layer (for example, a decoration layer) disposed on or over the first member and formed to reflect a portion of external light, a second layer (for example, a polymeric layer or a PET layer) disposed on or over the first layer and including a polymeric material, and a third layer (a coating layer or an anti-wear H/C layer) disposed on or over the second layer and having a hardness.

Figure 5A:
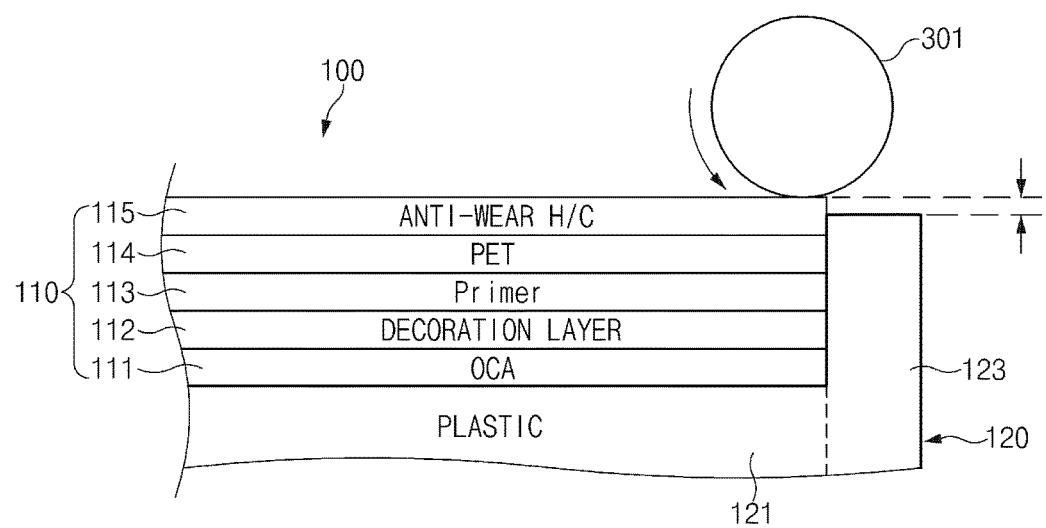
FIG. 5A is a diagram illustrating an example of a process for manufacturing an accessory device, according to an embodiment.

FIG. 5A is a diagram illustrating an example of a process for manufacturing an accessory device, according to an embodiment.

Referring to FIG. 5A, a cover, for example, the upper cover 100 may include a first plate 121, a first side wall 123 disposed at a periphery of the first plate 121, and a first film layer 110 seated in a seating area formed based on the first side wall 123. An upper end portion of the first film layer 110 may be formed to be higher than the first side wall 123.

In the process of arranging the first member 120 having the first side wall 123 and disposing the first film layer 110 on the first member 120, a pressing process may be performed to prevent a coming-out phenomenon during the use thereof. According to various embodiments, a precise pressing process for preventing a coming-out phenomenon of the first film layer 110 may be performed at a peripheral portion of the first side wall 123.

The type of the pressing process may be changed according to the seating form of the first film layer 110 of the first member 120. According to an embodiment, the roller 301 may press the first film layer 110 while moving towards an outer side of the first side wall 123 and the first film layer 110. The roller 301 may be rolled while pressing the first film layer 110 on the first plate 121 such that the first film layer 110 is firmly pressed without creating pores during the rolling process. The rolling operation may be repeated a specific number of times. After the pressing process, the first film layer 110 may be formed to be higher than the first side wall 123 upwards by a specific height while being firmly pressed and fixed to the first plate. The coating layer 115 formed to be higher than the first side wall 123 may absorb a pressure or an impact applied from the outside.

Figure 5B:
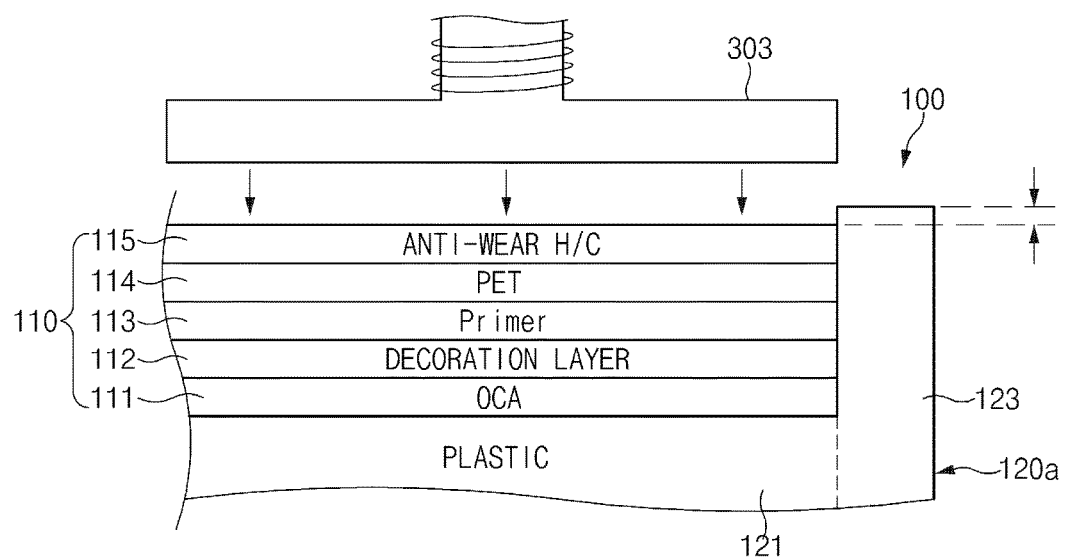
FIG. 5B is a diagram illustrating an example of a process for manufacturing an accessory device, according to an embodiment.

FIG. 5B is a diagram illustrating an example of a process for manufacturing an accessory device, according to an embodiment.

Referring to FIG. 5B, a cover, for example, the upper cover 100 may include a member 120a and a first film layer 110. The member 120a, for example, may include a first plate 121 and a side wall 123a. The first film layer 110, for example, may include a coating layer 115, a polymeric layer 114, a first bonding layer 113, a decoration layer 112, and a second bonding layer 111. The first film layer 110 may be disposed adjacently to the side wall 123 while being seated on the first plate 121. In some implementations, the side wall 123 may surround the first film layer 110. In some implementations, the side wall 123 may extend from a periphery of the first plate 121 to be perpendicular to the first plate 121 by a specific height. According to various embodiments, the side wall 123 a may be formed to be higher than the first side wall 123 described with reference to FIG. 5A by a specific height or more. Accordingly, an upper end of the side wall 123 may be arranged to be higher than the upper surface (or the upper surface of the coating layer 115) of the first film layer 110.

As illustrated in FIG. 5B, a press 303 may press the first film layer 110. The press 303, for example, may press the first film layer 110 towards the first plate 121. The press 303, for example, may have a pressing surface that is the same as the size of the first film layer 110 or smaller than the size (or thickness) of the first film layer 110 in consideration of a mechanical tolerance. Further, the press 303 may have a pressing surface corresponding to a seating space defined by the side wall 123. The press 303 may be positioned on the first film layer 110, and may press the first film layer 110 towards the first plate 121 vertically downwards by a specific number of times. At least a portion of the surface of the press 303 may be formed of an elastic material (for example, rubber) to prevent damage to the coating layer 115.

Figure 5C:
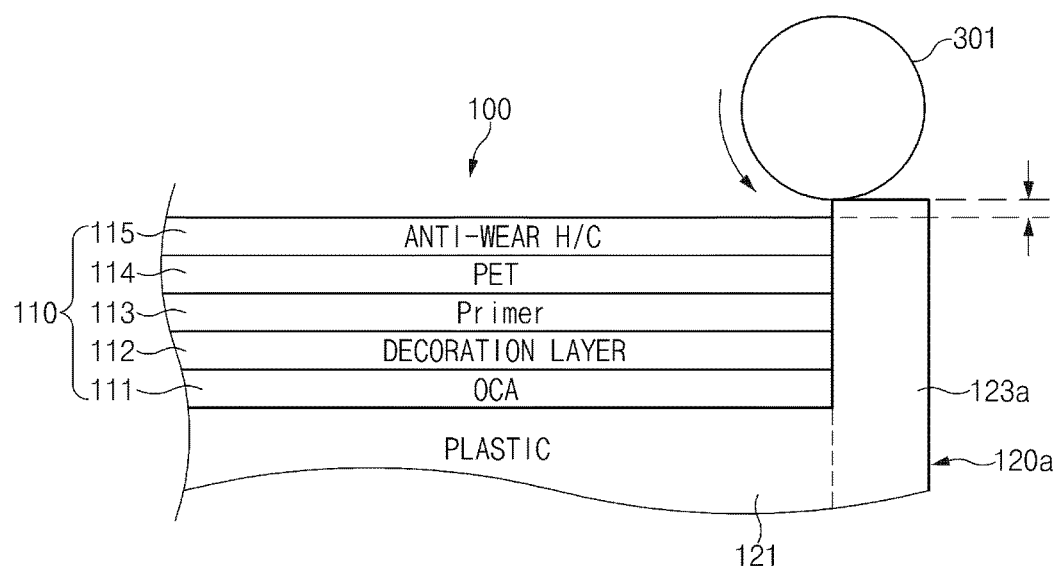
FIG. 5C is a diagram illustrating an example of a process for manufacturing an accessory device, according to an embodiment.

FIG. 5C is a diagram illustrating an example of a process for manufacturing an accessory device, according to an embodiment.

Referring to FIG. 5C, a cover, for example, the upper cover 100 may include a member 120a and a first film layer 110. Similar to the aforementioned first film layer, the first film layer 110 may include a coating layer 115, a polymeric layer 114, a first bonding layer 113, a decoration layer 112, and a second bonding layer 111. The member 120a, for example, may include a first plate 121 and a side wall 123a. The side wall 123a, for example, may extend beyond the upper surface of the first film layer 110. Accordingly, while the entire side surface of the first film layer 110 is arranged to face the side wall 123a, and the periphery and the side wall 123a of the first film layer 110 may form a step.

In relation to the pressing of the aforementioned first film layer 110 of the upper cover 100, a roller 301 may be used. The roller 301 may press the first film layer 110 to the first plate 121 while being moved from the outer side of the side wall 123a to the inside of the first film layer 110. Further, the roller 301 may press the first film layer 110 to the first plate 121 while being moved from the inside of the first film layer 110 to the side wall 123a. A surface of the roller 301, for example, may be formed of a resilient material to prevent damage to the side wall 123a or the surface of the first film layer 110.

The form of the member 120a and the first film layer 110 of the upper cover 100 may be applied to the lower cover 200 in the same way. According to various embodiments, the pressing process may be performed by alternately performing a process of operating the roller 301 and a process of operating the press 303. For example, after a primary pressing process using the roller 301 is performed on the covers of FIGS. 5A, 5B, and 5C, a secondary pressing process using the press 303 may be performed. Additionally, a tertiary pressing process using the roller 301 may be performed.

Figure 6:
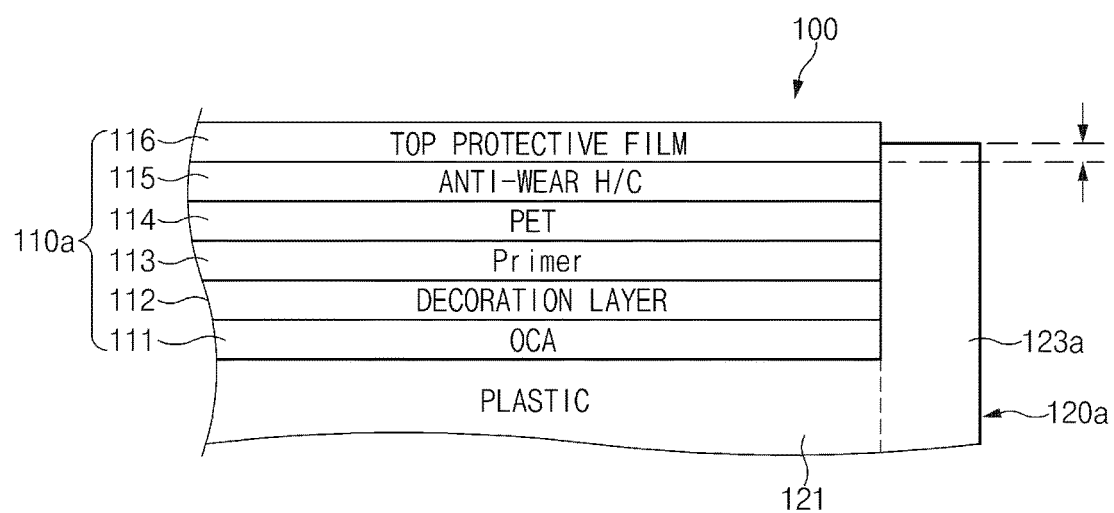
FIG. 6 is a partial cross-sectional view of an accessory device, according to an embodiment.

FIG. 6 is a partial cross-sectional view of an accessory device, according to an embodiment. Referring to FIG. 6, a cover, for example, the upper cover 100 may include a member 120a and a film layer 110a. According to various embodiments, both the member 120a and the film layer 110a may be applied to the lower cover in the same way.

The member 120a, for example, may include a first plate 121 and a side wall 123a. The first plate 121 may include a surface corresponding to the film layer 110a, and may be formed of a translucent or transparent material. The side wall 123a may extend from a periphery of the first plate 121 to be perpendicular to the first plate 121 by a specific height. The height of the side wall 123a may be lower than the upper surface of the film layer 110a positioned on the first plate 121. According to an embodiment, an upper end of the side wall 123a may be higher than the coating layer 115 of the film layer 110a, and may be lower than the protective layer 116.

The film layer 110a, for example, may include a protective layer 116, a coating layer 115, a polymeric layer 114, a first bonding layer 113 (primer), a decoration layer 112, and a second bonding layer 111. The protective layer 116 is positioned on the coating layer 115 to protect the coating layer 115 such that foreign substances are not stuck to the coating layer 115 and prevent damage to the coating layer 115 during the accessory device manufacturing process. The protective layer 116 may have a surface that is the same as or similar to a surface of the coating layer 115. The upper surface of the protective layer 116 may be arranged to be higher than the side wall 123a. According to various embodiments, the protective layer 116 may be removed after the process of pressing the film layer. According to various embodiments, while the protective layer 116 is positioned on the film layer, the film layer may be firmly pressed to the first plate 121 by applying a physical force to the protective layer 116 with a roller in the pressing process.

Figure 7:
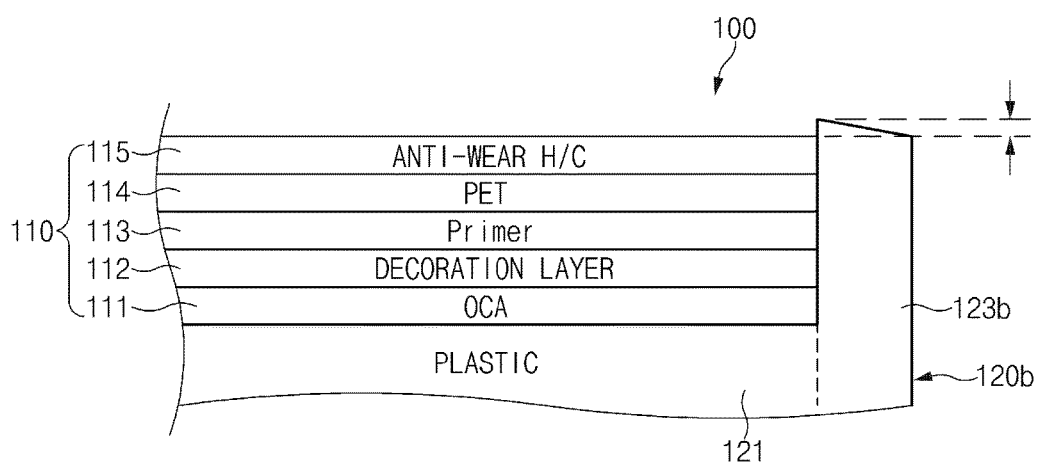
FIG. 7 is a partial cross-sectional view of an accessory device, according to an embodiment.

FIG. 7 is a partial cross-sectional view of an accessory device, according to an embodiment.

Referring to FIG. 7, a cover, for example, the upper cover 100 may include a member 120b and a first film layer 110. Similar to the aforementioned first film layer, the first film layer 110 may include a coating layer 115, a polymeric layer 114, a first bonding layer 113, a decoration layer 112, and a second bonding layer 111. The member 120b, for example, may include a first plate 121 and a side wall 123b. The side wall 123b, for example, may be formed such that an upper end thereof is higher than an upper surface of the first film layer 110, and an opposite upper end thereof has a height similar to the upper surface of the first film layer 110. For example, the side wall 123b may be arranged such that the height thereof gradually decreases as it goes from the upper inner side to the upper outer side. The upper cover 100 may give an aesthetic feeling in which the entire outer line of the accessory device proceeds softly outwards by an inclination of the member 120b. Although it is illustrated in the drawing that the outer line of the accessory device is slanted, the upper surface of the side wall 123b may be curved. According to various embodiments, the member 120b and the first film layer 110 of the upper cover 100 also may be applied to the member and the film layer of the lower cover 200 in the same or similar way.

Figure 8:
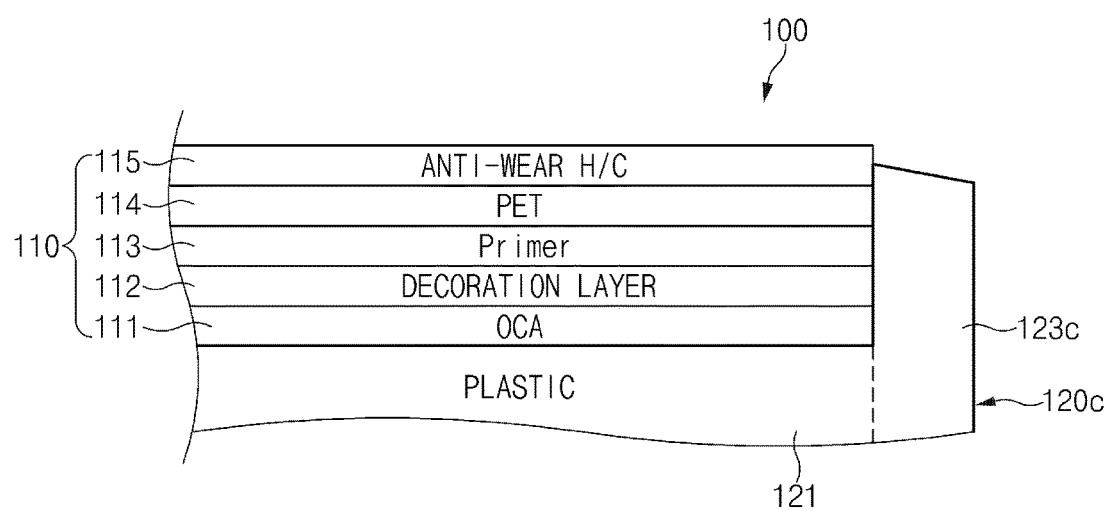
FIG. 8 is a partial cross-sectional view of an accessory device, according to an embodiment.

FIG. 8 is a partial cross-sectional view of an accessory device, according to an embodiment.

Referring to FIG. 8, a cover, for example, the upper cover 100 may include a member 120c and a first film layer 110. Similar to the aforementioned first film layer, the first film layer 110 may include a coating layer 115, a polymeric layer 114, a first bonding layer 113, a decoration layer 112, and a second bonding layer 111. The member 120c, for example, may include a first plate 121 and a side wall 123c. The side wall 123c, for example, may be formed such that an upper end thereof is lower than the upper surface of the first film layer 110 and an opposite upper end thereof is lower than the upper end thereof. For example, an upper portion of the side wall 123c may be arranged such that the height thereof gradually decreases as it goes from the upper inner side to the upper outer side. The upper inner side of the side wall 123c, for example, may be arranged to be lower than the coating layer 115. According to various embodiments, the upper outer side of the side wall 123c, for example, may have a height that is the same as or similar to the bottom of the coating layer 115. The upper cover 100 may give an aesthetic feeling in which the entire outer line of the accessory device proceeds softly outwards by an inclination of the member 120c. Further, while the first film layer 110 is formed to be higher than the side wall 123c, a periphery of the entire upper surface of the accessory device is finished in a smooth curve form to provide an improved grip feeling.

Figure 9:
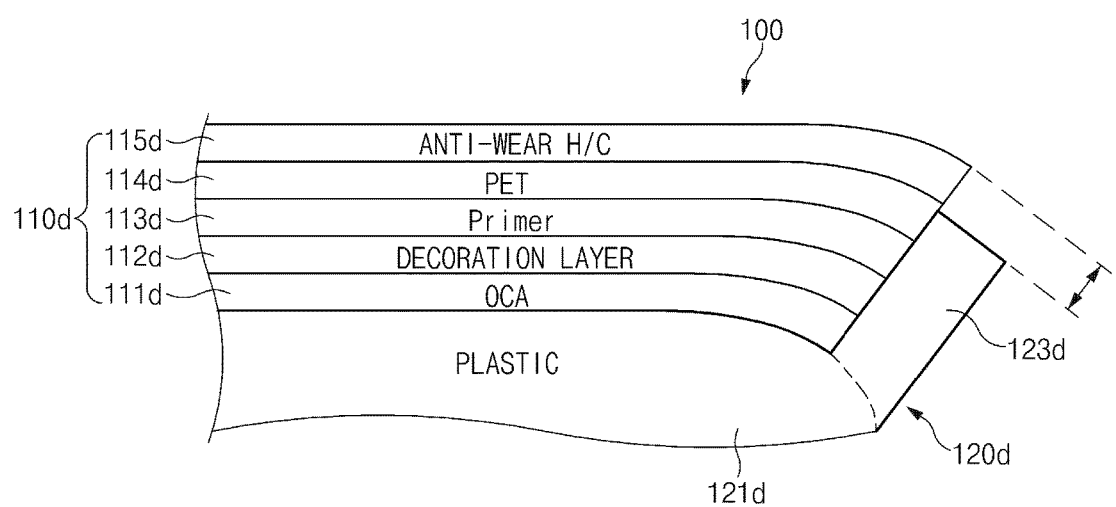
FIG. 9 is a partial cross-sectional view of an accessory device, according to an embodiment.

FIG. 9 is a partial cross-sectional view of an accessory device, according to an embodiment.

Referring to FIG. 9, a cover, for example, the upper cover 100 may include a member 120d and a film layer 110d. The film layer 110d may include a coating layer 115d having a flat portion and a curved portion (or an inclined portion), a polymeric layer 114d having a flat portion and a curved portion, a first bonding layer 113d having a flat portion and a curved portion, a decoration layer 112d having a flat portion and a curved portion, and a second bonding layer 111d having a flat portion and a curved portion. The sizes of the flat portions and the curved portions of the coating layer 115d, the polymeric layer 114d, the first bonding layer 113d, the decoration layer 112d, and the second bonding layer 111d may be the same or different. For example, as illustrated, the side wall 123d of the member 120d may extend while having a specific inclination (for example, a direction that is inclined outwards) from the plate 121d. Accordingly, the curved portion of the coating layer 115d may be formed to be larger than the curved portion of the second bonding layer 111d.

According to various embodiments, the width of the side wall 123d that faces the film layer 110d may be shorter than the width of a side surface of a periphery of the film layer 110d. According to an embodiment, the coating layer 115d may be arranged to be higher than the side wall 123d. According to various embodiments, the upper surface of the polymeric layer 114d may be arranged to be higher than the side wall 123d. Although it is illustrated in the drawing that the coating layer 115d does not face the side wall 123d, according to various embodiments, at least a portion of the side wall 123d may face at least a portion of the coating layer 115d. The upper surface of the side wall 123d, for example, may be inclined in a direction in which the curved portion extends.

The plate 121*d* has a flat bottom surface, and a portion of the upper surface thereof may include a flat portion and the remaining portions thereof may include a curved portion. According to various embodiments, the bottom surface of the plate 121 may include a flat portion and a curved portion corresponding to those of the upper surface thereof. According to an embodiment, the member 120*d* may be curved.

According to various embodiments, a portion of the upper cover 100 or the lower cover 200 in which a curved portion is formed may be applied to some portions. For example, a portion of at least one of the left and right sides of the upper cover 100 or the lower cover 200 may include a curved portion. The upper and lower sides of the upper cover 100 or the upper and lower sides of the lower cover 200 may include a flat portion.

Figure 10:
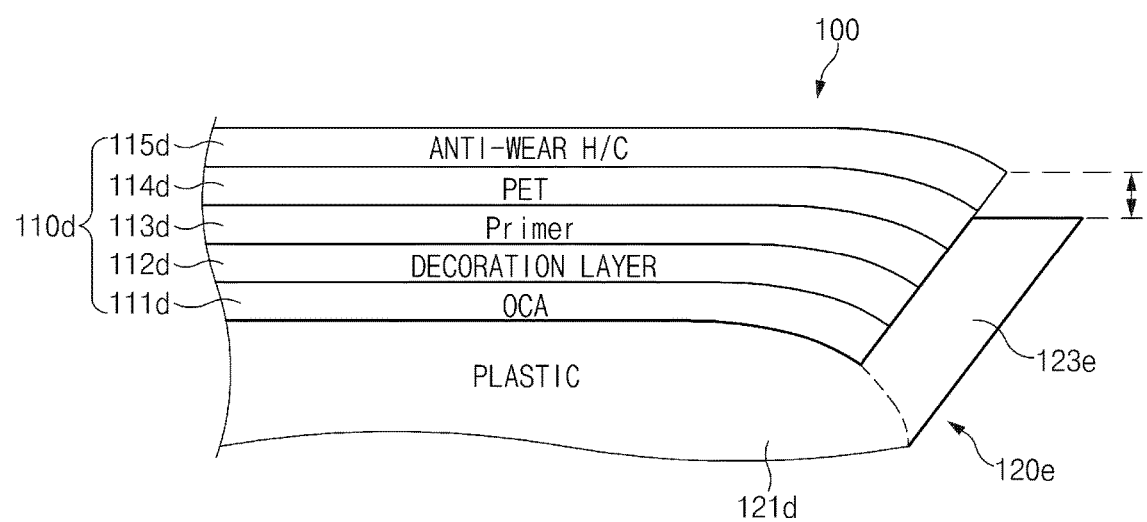
FIG. 10 is a partial cross-sectional view of an accessory device, according to an embodiment.

FIG. 10 is a partial cross-sectional view of an accessory device, according to an embodiment.

Referring to FIG. 10, a cover, for example, the upper cover 100 may include a film layer 110*d* including a curved portion and a member 121*e*. The film layer 110*d* including the curved portion may include configurations that are the same as or similar to the film layer described with reference to FIG. 9.

The member 121*e* may include a plate 121*d* and a side wall 123*e*. The plate 121*d*, for example, may include a flat portion at an upper portion thereof, and a peripheral portion disposed proximate to the flat portion may include a curved portion. The side wall 123*e* may extend from a peripheral portion of the plate 121*d* by a specific height while having a specific inclination. The aforementioned plate 121*d* may have a form that is the same as or similar to the plate described with reference to FIG. 9. The side wall 123*e* may extend from a periphery of the plate 121 while having a specific inclination in an outwardly slanted direction. The upper surface of the side wall 123*e*, for example, may be disposed in parallel to the plate 121. The side wall 123*e* may have a height lower than the upper surface of the film layer 110*d*.

Figure 11A:
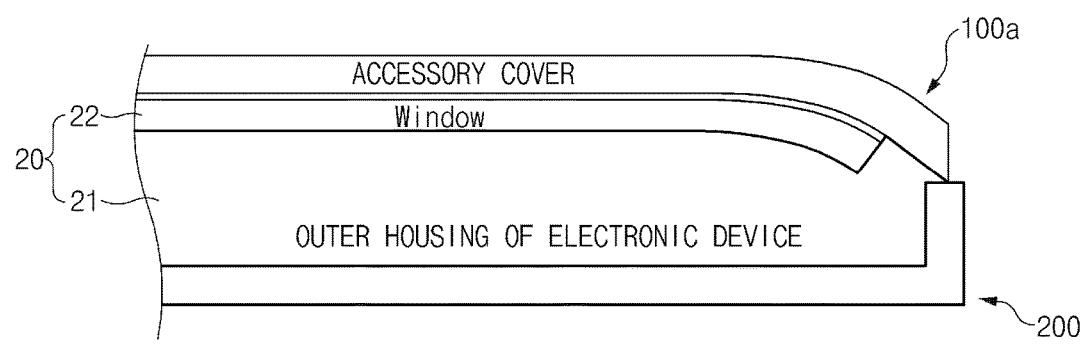
FIG. 11A is a diagram illustrating an example of accessory device in a closed state, according to an embodiment.

FIG. 11A is a diagram illustrating an example of accessory device in a closed state, according to an embodiment.

Referring to FIG. 11A, according to various embodiments, the electronic device 20 may include a body 21 and a window 22. The body 21 of the electronic device 20 may be seated on the lower cover 200 of the accessory device 10. The lower cover 200 may be arranged to surround a side surface of the body 21 of the electronic device 20. According to various embodiments, a periphery of the lower cover 200 may include a side wall having a specific inclination, the height of which increases from the outside to the inner side.

The electronic device 20 may include a flat portion and a curved portion. According to an embodiment, a portion of a periphery of the electronic device 20 may be a curved portion. Correspondingly, a window 22 (for example, glass, protective glass, or a display) of the electronic device 20 may include a flat portion and a curved portion.

The upper cover 100*a* may include a flat portion and a curved portion. For example, a peripheral area of the upper cover 100*a* may include a curved portion. While the upper cover 100*a* is arranged to cover the window (for example, a window of the display) of the electronic device 20, an end of the peripheral portion of the upper cover 100*a* may face a side wall of the lower cover 200.

Figure 11B:
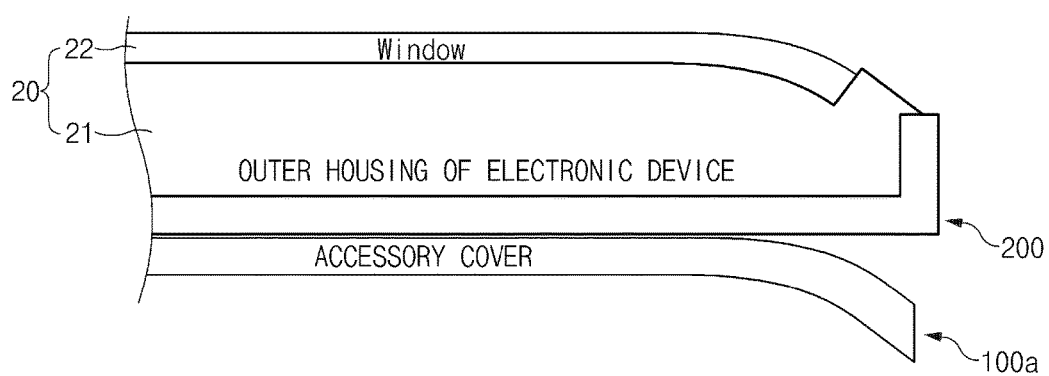
FIG. 11B is a diagram illustrating an example of accessory device in an opened state, according to an embodiment.

FIG. 11B is a diagram illustrating an example of accessory device in an opened state, according to an embodiment.

Referring to FIG. 11B, the electronic device 20 may include a body 21 and a window 22. The body 21 may be seated on and fixed to the lower cover 200 of the accessory device. The upper cover 100*a* of the accessory device may be hinged about the lower cover 200 in a specific direction. Accordingly, the upper surface of the upper cover 100*a* may face the rear surface of the lower cover 200. The upper cover 100*a* may include a flat central portion and a curved peripheral portion. The curved peripheral portion may maintain a curved state in correspondence to rotation of the upper cover 100*a*.

According to a hinge operation of the upper cover 100*a*, the window 22 of the electronic device 20 may be arranged to be exposed to the outside. While the lower cover 200 is arranged to surround a side surface of the electronic device 20, the rear surface of the lower cover 200 may face the upper surface of the upper cover 100*a* as the upper cover 100*a* is rotated.

According to various embodiments, although it has been described with reference to FIGS. 11A and 11B that the accessory device includes the lower cover 200, various embodiments are not limited thereto. For example, according to various embodiments, the accessory device includes the upper cover 100*a*, and may be fixed to one side of the electronic device 20. The upper cover 100*a*, for example, further includes a connector, and the connector may be coupled and fixed to one side of the electronic device 20.

Figure 12:
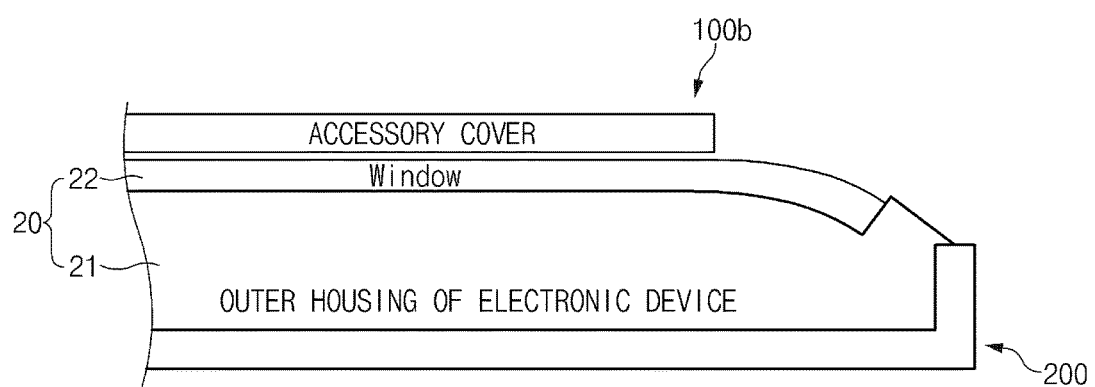
FIG. 12 is diagram illustrating an example of an accessory device that is mounted on an electronic device, according to an embodiment.

FIG. 12 is diagram illustrating an example of an accessory device that is mounted on an electronic device, according to an embodiment.

Referring to FIG. 12, the accessory device may include a lower cover 200 and an upper cover 100*b*. The lower cover 200 may be arranged to surround a side surface of the body 21 of the electronic device 20. The upper cover 100*b* may be arranged to cover the window 22 of the electronic device 20.

According to various embodiments, the window 22 may include a flat portion and a curved peripheral portion. The upper cover 100*b* may be arranged to cover only the flat portion. Accordingly, while the upper cover 100*b* is arranged to cover the window 22 of the electronic device 20, the peripheral curved portion of the window 22 of the electronic device 20 may be exposed to the outside.

Because an end of the upper cover 100*b* is connected neither to a periphery of the electronic device nor to an end of the lower cover when the upper cover 100*b* is turned to the rear surface of the electronic device to be used, the lower cover may be gripped while the upper cover 100*b* is also gripped. Accordingly, the accessory device may provide a stable grip feeling while the covers are folded by a hinge of the upper cover 100*b*.

Figure 13:
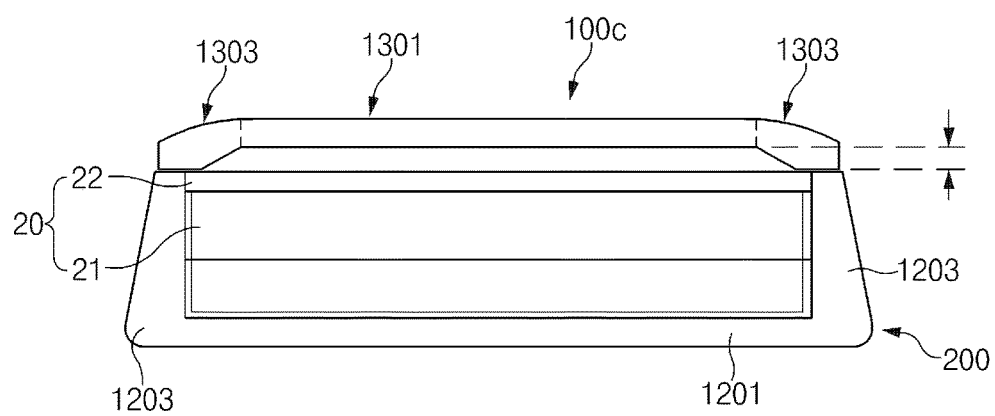
FIG. 13 is diagram illustrating an example of an accessory device that is mounted on an electronic device, according to an embodiment.

FIG. 13 is diagram illustrating an example of an accessory device that is mounted on an electronic device, according to an embodiment.

Referring to FIG. 13, according to various embodiments, the electronic device 20 may include a body 21 and a window 22. The window 22 may be a panel formed of glass or a transparent material. The window 22, for example, may face the inside of the upper cover 100*c* of the accessory device 10. The body 21 of the electronic device 20 may be seated on and fixed to the lower cover 200. As illustrated, the lower cover 200 may include a member 1201 that faces the bottom of the body 21 of the electronic device 20, and side walls 1203 extending from opposite sides of the member 1201 perpendicularly to the member 1201. The side walls 1203, for example, may be formed to be thicker at a lower portion thereof that at an upper portion thereof. According to an embodiment, the inner surfaces of the side walls 1203 extend from the bottom of the member 1201, and the sectional areas of the outer sides thereof gradually increase as they go from the lower side to the upper side (for example, an oblique shape).

The upper cover 100c may include a flat central portion 1301, and a protrusion protruding from a periphery of the central portion 1301 in the second direction. The protrusion, for example, may include a curved portion 1303 bent from a periphery of the central portion 1301. An end of the curved portion 1303 may be arranged to be lower than the lower surface of the central portion 1301 in the second direction while the upper cover 100c is arranged to cover the display of the mounted electronic device. The curved portion 1303 may face the upper surface of the side wall 1203 of the lower cover 200 while the upper cover 100c is arranged to cover the window 22 of the electronic device 20. Accordingly, the upper cover 100c may be spaced apart from the window 22 of the electronic device 20 while a central portion thereof faces the window 22. In the above-structured accessory device, because the upper cover 100c does not make direct contact with the window 22 of the electronic device 20, scratches of the window 22 by the inside of the upper cover 100c, damage to the window 22 by an external pressure or an impact, or breakdown of the window 22 by foreign substances disposed on the display may be prevented.

Figure 14:
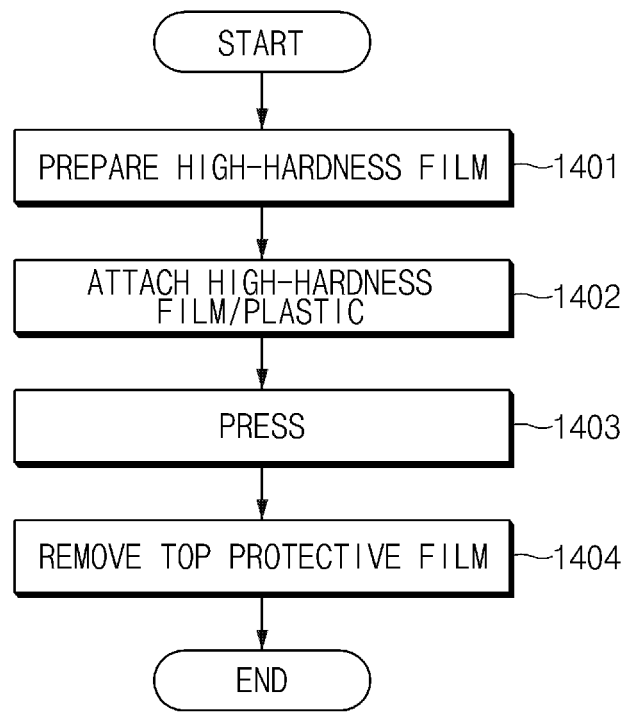
FIG. 14 is a flowchart of an example of a process for manufacturing an accessory device, according to an embodiment.

FIG. 14 is a flowchart of an example of a process for manufacturing an accessory device, according to an embodiment.

Referring to FIG. 14, in the method for manufacturing an accessory device according to an embodiment, in operation 1401, a film of a specific hardness (for example, an anti-scratch hardness) may be prepared. According to an embodiment, the anti-scratch film may undergo a drying (aging) process. The drying process, for example, may be performed for a first time period (for example, 20 to 26 hours) at a first temperature range (for example, 40 to 80 degrees Celsius). According to various embodiments, the anti-scratch film that is to be applied to an accessory device including a flat portion or an accessory device including a curved portion may undergo the above-described drying process.

In operation 1402, an anti-scratch film and a plastic may be attached. In relation to the operation, a plastic (for example, a substrate) injection-molding process may be performed. The plastic injection-molding process may be performed in a first pressure condition (for example, pressure N1 (0.2 to 0.9 MPa) and pressure N2 (0.1 to 0.9 MPa)) irrespective of the type (a type including only a flat portion or a type in which a peripheral portion thereof is a curved portion) of an accessory device, which is to be applied.

In operation 1403, a pressing operation may be performed. The pressing operation may be performed differently for the accessory device including only a flat portion and the accessory device in which a peripheral portion is a curved portion. For example, for the accessory device including only a flat portion, a pressing operation is performed by using a laminating machine in a first condition (air pressure: 0.2 to 0.9 MPa, roller pressure: 0.1 to 0.5 MPa), and an auto-clave operation is performed in a second condition (pressure press: 6 to 10 kgf, temperature: 40 to 60 degrees Celsius, time period: 10 to 20 minutes).

The apparatus for pressing an accessory device including a curved portion performs a pressing operation by using a laminating machine (LAMI 2D machine) in a first condition (air pressure: 0.2 to 0.9 MPa, roller pressure: 0.1 to 0.5 MPa), performs a laminating pressure operation in a third condition (pressure: 0.2 to 0.7 MPa, time period: 8 to 12 seconds), and performs an auto-clave operation in a second condition (pressure press: 6 to 10 kgf, temperature: 40 to 60 degrees Celsius, time period: 10 to 20 minutes).

In operation 1404, the top protective film (for example, a protective layer) may be removed. According to various embodiments, the top protective film removing operation may be omitted. For example, the film layer may be provided to include a top protective film.

Figure 15:
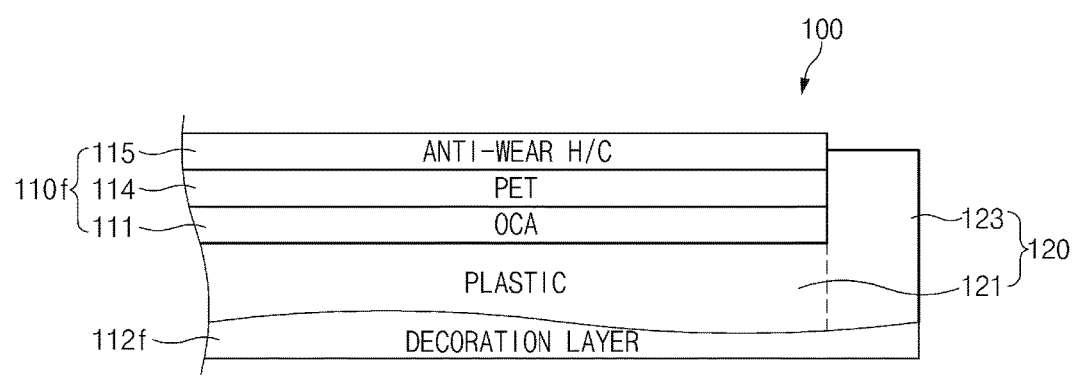
FIG. 15 is a partial cross-sectional view of an accessory device, according to an embodiment.

FIG. 15 is a partial cross-sectional view of an accessory device, according to an embodiment.

Referring to FIG. 15, a cover, for example, the upper cover 100 may include a film layer 110f, a member 120 and a film layer 112f. The film layer 110f, for example, may include a coating layer 115, a polymeric layer 114, and a bonding layer 111. The first member 120 may include a first plate 121 and a first side wall 123. The bonding layer 111 may fix the film layer 110f to the first plate 121 while being positioned on the plate 121. The coating layer 115 is positioned on the polymeric layer 114 to prevent generation of scratches due to a pressure or an impact applied from the outside.

The decoration layer 112f may be disposed under the first plate 121 and the first side wall 123. The decoration layer 112f, for example, may include a printing layer, a UV pattern printing layer, and a multi-deposition layer when being applied to the upper cover 100. The decoration layer 112f, for example, may include a printing layer, a UV pattern printing layer, a multi-deposition layer, and a rear surface printing layer when being applied to the lower cover 200. A bonding layer may be arranged between the decoration layer 112f and the member 120 to additionally dispose the decoration layer 112f under the member 120. According to various embodiments, the decoration layer 112f may have an area that is smaller than that of the first plate 121. For example, the first plate 121 may be arranged in a form in which the entire area of the first plate 121, except for an area of the first side wall 123, is engraved by a specific depth (for example, the depth of the decoration layer 112f). The decoration layer 112f may be disposed on the engraved first plate 121, and the height of the decoration layer 112f may be the same as or similar to the height of a lower end of the first side wall 123. According to various embodiments, the decoration layer 112f may be disposed under the first plate 121 such that the coating layer 115 and the polymeric layer 114 are disposed on the first plate 121.

Figure 16:
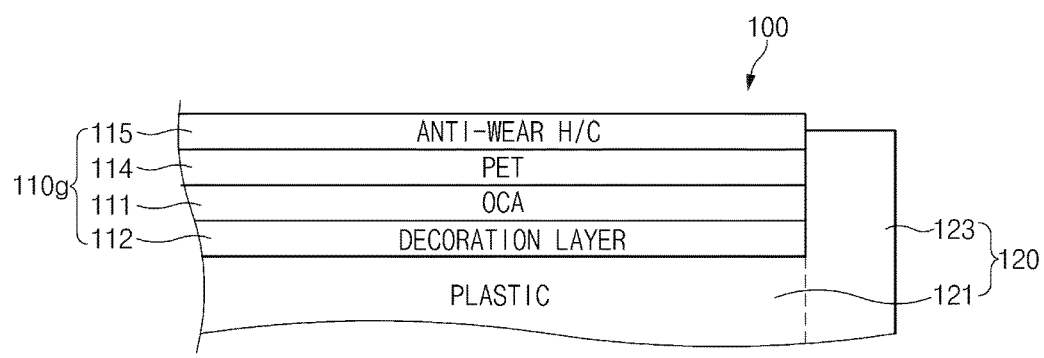
FIG. 16 is a partial cross-sectional view of an accessory device, according to an embodiment.

FIG. 16 is a partial cross-sectional view of an accessory device, according to an embodiment.

Referring to FIG. 16, a cover, for example, the upper cover 100 may include a film layer 110g and a substrate 120. The first member 120 may include a first plate 121 and a first side wall 123. The first plate 121 and the first side wall 123 may have shapes that are the same as or similar to those of the plate and the side wall described with reference to FIG. 4.

The film layer 110g may be transparent or translucent and reflective, and may be disposed in the first plate 121 of the member 120. The periphery of the film layer 110g may be arranged to face the first side wall 123 when the film layer 110g is positioned on the first plate 121. Then, the film layer 110g may be arranged to be higher than an upper end of the first side wall 123. The film layer 110g, for example, may include a coating layer 115, a polymeric layer 114, a bonding layer 111, and a decoration layer 112. The bonding layer 112 may be an OCA. The decoration layer 112, for example, may include a printing layer, a UV pattern printing layer, and a multi-deposition layer when being applied to the upper cover 100. The decoration layer 112, for example, may include a printing layer, a UV pattern printing layer, a multi-deposition layer, and a rear surface printing layer when being applied to the lower cover 200. Additionally, a bonding layer may be arranged between the decoration layer 112 and the first plate 121.

Figure 17:
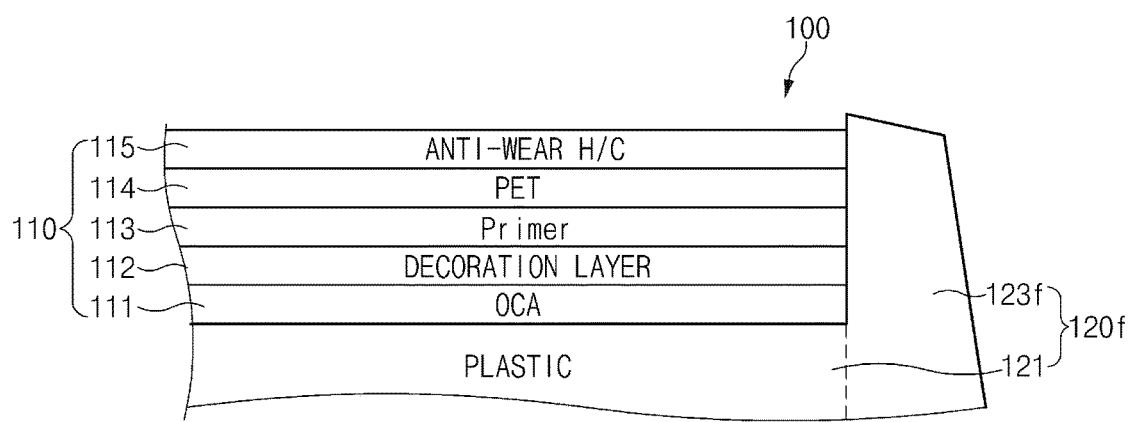
FIG. 17 is a partial cross-sectional view of an accessory device, according to an embodiment.

FIG. 17 is a partial cross-sectional view of an accessory device, according to an embodiment.

Referring to FIG. 17, a cover, for example, the upper cover 100 may include a member 120*f* and a first film layer 110. The first member 120*f* may be formed of a plastic substrate or of a transparent or translucent polymeric material. The first member 120*f* may include a first plate 121 and a side wall 123*f*. The first plate 121, for example, may have an area corresponding to the size of a front surface or a rear surface of the electronic device. The side wall 123*f* may extend from a periphery of the first plate 121 at a specific angle (for example, the right angle from the first plate 121) from the first plate 121 by a specific height. According to an embodiment, the side wall 123 may have a seating area at the entire periphery of the first plate 121 in a band shape. The height of the side wall 123*f*, for example, may be higher than the sum of the height of the first plate 121 and the height of the first film layer 110 positioned on the first plate 121. The cross-sectional area of the side wall 123*f* may gradually increase as it goes from the lower side to the upper side. The inside of the side wall 123*f* may be vertically formed. Accordingly, the side wall 123*f* is formed such that the thickness of the outer side of the side wall 123*f* gradually increases as it goes from the lower side to the upper side.

The first film layer 110, for example, may include a coating layer 115, a polymeric layer 114, a first bonding layer 113 (primer), a decoration layer 112, and a bonding layer 111. The first film layer 110 may have a configuration that is the same as or similar to the film layer described with reference to FIG. 4.

Figure 18:
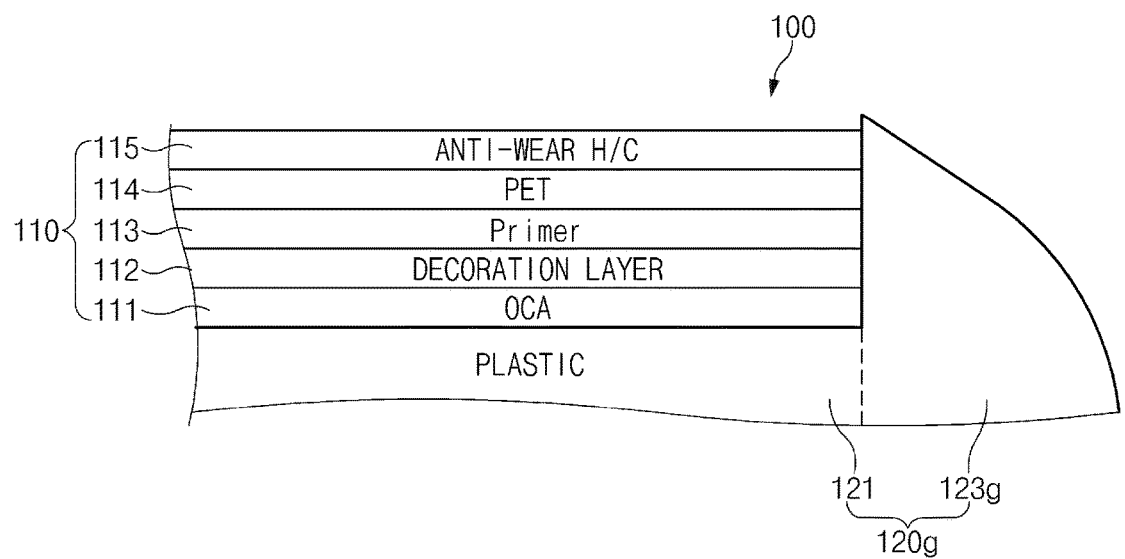
FIG. 18 is a partial cross-sectional view of an accessory device, according to an embodiment.

FIG. 18 is a partial cross-sectional view of an accessory device, according to an embodiment.

Referring to FIG. 18, a cover, for example, the upper cover 100 may include a member 120*g* and a first film layer 110. The first member 120*g* may include a first plate 121 and a side wall 123*g*. The first plate 121, for example, may have an area corresponding to the size of a front surface or a rear surface of the electronic device. The side wall 123*g* extends from a periphery of the first plate 121, and the inner surface of the side wall 123*g* is vertically formed and the outer surface thereof has a semi-elliptical or spiral shape. For example, the side wall 123*g* becomes curved as it extends from the plate 121. An upper end of the side wall 123*g*, for example, may be formed to be higher than the upper surface of the first film layer 110.

The first film layer 110, for example, may include a coating layer 115, a polymeric layer 114, a first bonding layer 113 (primer), a decoration layer 112, and a bonding layer 111. The first film layer 110 may have a configuration that is the same as or similar to the film layer described with reference to FIG. 4.

Because the side wall of the upper cover 100 is smoothly curved at a peripheral portion of the upper cover 100, the upper cover 100 may provide an appealing aesthetic feeling and a soft feeling when the upper cover 100 is gripped.

In a process of pressing an edge type accessory device including a curved area, a step (a relative height of the film layer to the member) may be important. When the height of the side wall of the member is higher than the height of the film layer in an edge type accessory device, a strong force cannot be given to an end of the curved portion of the film layer during a pressing operation. In a process of pressing an edge type accessory device, a force that is stronger than a pressing force applied to a flat accessory device may be applied to an end of the film layer due to a property of returning the film layer (to a shape before the film layer is bent).

In relation to the pressing process, in the edge type accessory device, a step (between a side wall and the upper surface of the film layer that are adjacent to each other) may be equal to or less than the thickness (obtained by removing the top protective film) of the film layer.

Then, the side wall of the member may prevent delamination of a film due to an external lateral force. According to an embodiment, the side wall may be arranged to protect at least one bonding layer (for example, an OCA layer in contact with the plate). Accordingly, the range of the step may be a thickness from the uppermost end layer of the side wall to a layer before the OCA layer.

According to an aspect of the present disclosure, there is provided an accessory device detachably mounted on a mobile electronic device, the electronic device including a housing having a first surface facing a first direction and a second surface facing a second direction opposite to the first direction, the accessory device including a first cover (for example, an upper cover) disposed on the first surface of the housing of the electronic device to be opened and closed, wherein the first cover includes a first member including a first plate covering the first surface of the housing and at least one first side wall having a transparency and protruding from a portion of the first plate in the first direction, and a first film layer having a transparency and disposed in the interior of an area defined by the at least one first side wall, and wherein the first film layer includes a transparent or translucent first layer (for example, a decoration layer) disposed on or over the first member and formed to reflect a portion of external light, a second layer (for example, a polymeric layer) disposed on or over the first layer and including a polymeric material, and a third layer (a coating layer) disposed on or over the second layer and having a hardness.

According to various embodiments, the first film layer may further include a bonding layer disposed between at least a portion of the first member and the first layer.

According to various embodiments, the first film layer may further include a primer layer disposed between the first layer and the second layer.

According to various embodiments, the first film layer may further include a protective film disposed on or over the third layer.

According to various embodiments, a height of the first side wall may be different from a height of the first film layer disposed on or over the first plate.

According to various embodiments, the height of the first side wall may be lower than a height of an upper surface of the first film layer.

According to various embodiments, at least a portion of an outer surface of the at least one first side wall may be inclined.

According to various embodiments, the first side wall may be formed such that a height of the inner wall is higher than a height of an outer wall.

According to various embodiments, the first member may further include a protrusion protruding in the second direction.

According to various embodiments, when the accessory device is mounted on the electronic device, the protrusion may make contact with at least a portion of the first surface of the housing and a central portion of the first member connected to the protrusion may be spaced apart from the first surface of the housing.

According to various embodiments, the first member may include a flat portion and a curved portion.

According to various embodiments, the accessory device may further include a second cover connected to the first cover, and the second cover may include a second member including a second plate, when the second cover is mounted on the electronic device, disposed on the second surface of the housing, and at least one second side wall having a transparency and protruding from at least a portion of the second plate in the second direction, and a second film including a fourth layer disposed on or over the second plate and formed to reflect at least a portion of external light, a fifth layer disposed on or over the fourth layer, and including a polymeric material, and a sixth layer disposed on or over the fifth layer and having a hardness of a specific value or more.

According to various embodiments, a height of an upper surface of the second side wall may be lower than a height of an upper surface of the second film layer.

According to various embodiments, the second film layer may further include at least one of a bonding layer disposed between the fourth layer and the second plate, or a bonding layer disposed between the fifth layer and the fifth layer.

According to various embodiments, the second member may include a flat portion and a curved portion.

According to various embodiments, the second cover may further include a connector configured to surround at least a portion of a side surface of the housing when the second cover is mounted on the electronic device, and extending between the first plate and the second plate.

According to various embodiments, the connector may be formed of the same material as that of the first member or the second member.

According to another aspect of the present disclosure, there is provided a method for manufacturing an accessory that is mountable on an electronic device including a first surface that faces a first side, a second surface that faces a second side opposite to the first side, and a side surface that surrounds at least a portion of a space between the first surface and the second surface, the method including disposing a first plastic substrate including a base (for example, a plate) and at least one side wall protruding from at least a portion of the base in the first direction, attaching a multi-layered film including a transparent or translucent first member formed on the base of the first plastic substrate to reflect at least a portion of external light, a second member disposed on or over the first member and including a polymeric material, and a third member having a specific hardness of a selected value or more, and applying a pressure to the multilayered film.

According to another aspect of the present disclosure, there is provided an accessory device detachably mounted on a mobile electronic device including a display, the accessory device including a translucent non-metallic plate (for example, a first member) configured to, when the accessory device is mounted on the electronic device, cover at least a portion of the display of the electronic device such that the portion of the display is opened and closed, and including a curved surface in the vicinity of at least one of peripheries thereof and a flat surface extending from the curved surface, at least one film layer conformally formed on a surface of the non-metallic plate that, when the accessory device is mounted on the electronic device, faces a side opposite to the display, and a member connected to a portion of the non-metallic plate and detachably mounted on the electronic device, wherein the at least one film layer transmits at least a portion of incident light from the display while reflecting at least a portion of incident light from an opposite side of the display.

According to various embodiments, the non-metallic plate may include a protrusion that, when the accessory device is mounted on the electronic device, faces a periphery of the display, and a central part connected to the protrusion and arranged to cover the display.

According to various embodiments, the film layer may be configured such that a coating layer having a specific thickness or greater and a specific hardness or higher is disposed on a surface opposite to the display.

According to various embodiments of the present disclosure, generation of a scratch of an accessory device that may be attached to and detached from an electronic device can be prevented.

In addition, various effects induced through the specification can be provided.

Further, the embodiments disclosed in the specification are provided to describe the technical contents or for understanding of the technical contents, and the technical scope of the present disclosure is not limited thereto. Accordingly, the scope of the present disclosure should be construed to include all changes or various embodiments based on the technical spirit of the present disclosure.

The present disclosure is provided only as an example. It would be understood that the module 200 may have the same or similar structure as the module 100 in accordance with any of the examples provided throughout the disclosure. No claim element herein is to be construed under the provisions of 35 U.S.C. 112, sixth paragraph, unless the element is expressly recited using the phrase "means for".

What is claimed is:

1. An accessory device comprising:
a first cover arranged to be opened and closed when the first cover is mounted on an electronic device, the first cover comprising a first plate, at least one first side wall protruding from the first plate in a first direction, and a first film disposed in a space defined by the sidewall and the plate,
wherein the first film and the first side wall are at least partially transparent, and wherein the first film comprises a first layer disposed on the first plate, the first layer being at least partially reflective, a second layer disposed on the first layer, the second layer being at least partially formed of a polymeric material, and a third layer that is disposed on the second layer, the third layer being an anti-wear layer.

2. The accessory device of claim 1, wherein the first film further comprises at least one of a bonding layer disposed between at least a portion of the first plate and the first layer and a primer layer disposed between the first layer and the second layer.

3. The accessory device of claim 1, wherein the first layer is transparent or translucent.

4. The accessory device of claim 1, wherein the first film further comprises a protective film disposed on or over the third layer.

5. The accessory device of claim 1, wherein a height of the first side wall is different from a height of the first film disposed on or over the first plate.

6. The accessory device of claim 5, wherein the height of the first side wall is lower than a height of the first film.

7. The accessory device of claim 1, wherein at least a portion of an outer surface of the first side wall is inclined.

8. The accessory device of claim 1, wherein the first cover further comprises a protrusion protruding in a second direction.

9. The accessory device of claim 8, wherein:
when the accessory device is mounted on the electronic device, the protrusion makes contact with at least a portion of a surface of the electronic device, and
a central portion of the first cover that is connected to the protrusion is spaced apart from the surface of the electronic device.

10. The accessory device of claim 1, wherein the first cover comprises a flat portion and a curved portion.

11. The accessory device of claim 1, further comprising:
a second cover that is coupled to the first cover, the second cover comprising a second plate, and at least one second side wall protruding from the second plate in a second direction, and a second film; and
wherein the second film includes a fourth layer disposed on the second plate, the second film being at least partially reflective, a fifth layer disposed on the fourth layer, the fifth layer being at least in part formed of a polymeric material, and a sixth layer disposed on the fifth layer and having a predetermined hardness.

12. The accessory device of claim 11, wherein a height of an upper surface of the second side wall is lower than a height of the second film.

13. The accessory device of claim 11, wherein the second film further comprises at least one of a bonding layer disposed between the fourth layer and the second plate and a bonding layer disposed between the fourth layer and the fifth layer.

14. The accessory device of claim 13, wherein the second cover comprises a flat portion and a curved portion.

15. The accessory device of claim 11, wherein the second cover further comprises a connector configured to surround at least a portion of a side surface of the electronic device when the second cover is mounted on the electronic device, and extending between the first plate and the second plate.

16. The accessory device of claim 15, wherein the connector is formed of the same material as the first plate or the second plate.

17. A method for manufacturing an accessory device that is mountable on an electronic device, the method comprising:
forming a first plastic substrate comprising a base and at least one side wall protruding from at least a portion of the base in a first direction;
forming a multilayered film on the first plastic substrate, the multilayered film comprising a transparent or translucent first layer that is formed on the base of the first plastic substrate to reflect at least a portion of incoming light, a second layer disposed on the first layer that is formed at least in part of a polymeric material, and a third layer having a predetermined hardness; and
applying pressure on the multilayered film.

18. An accessory device that is mountable on an electronic device having a display, the accessory device comprising:
a translucent plate configured to cover at least a portion of the display of the electronic device when the accessory device is mounted on the electronic device, and comprising a curved peripheral portion and a flat portion that is adjacent to the curved peripheral portion;
at least one film formed on the plate that faces a side opposite to the display, when the accessory device is mounted on the electronic device; and
a member connected to a portion of the plate that is arranged to be detachably mounted on the electronic device,
wherein the at least one film transmits at least a portion of incident light from the display while reflecting at least a portion of ambient light that is incident on the film.

19. The accessory device of claim 18, wherein the plate comprises:
a protrusion that faces a periphery of the display when the accessory device is mounted on the electronic device; and
a central portion coupled to the protrusion and arranged to cover the display.

20. The accessory device of claim 18, wherein the film includes a coating layer having a predetermined hardness.

* * * * *